US006016618A

United States Patent [19]

Attia et al.

[11] Patent Number: 6,016,618

[45] Date of Patent: Jan. 25, 2000

[54] LAMINATED ARTICLE

[75] Inventors: Omar Attia, Lakeview; Blaine Jackson, East Aurora; Andre Saint, Tonawanda; Brett Ulrich, South Wales, all of N.Y.

[73] Assignee: Avery Dennison Corporation, Pasadena, Calif.

[21] Appl. No.: 08/971,331

[22] Filed: Nov. 17, 1997

[51] Int. Cl.[7] .......................... B32B 31/12; B42D 15/00; B65D 65/28; G09F 3/10

[52] U.S. Cl. ............................ 40/633; 40/630; 156/289; 428/42.2; 428/42.3

[58] Field of Search ............................ 40/630, 633, 638, 40/665, 661.09; 156/256, 267, 289, 277; 428/42.3, 42.2

[56] References Cited

U.S. PATENT DOCUMENTS

| | | | |
|---|---|---|---|
| 3,197,899 | 8/1965 | Twentier . | |
| 4,138,234 | 2/1979 | Kubesa . | |
| 4,314,415 | 2/1982 | DeWoskin . | |
| 4,318,234 | 3/1982 | Charles et al. . | |
| 4,612,718 | 9/1986 | Golub et al. . | |
| 4,682,431 | 7/1987 | Kowalchuk . | |
| 5,026,084 | 6/1991 | Pasfield . | |
| 5,048,870 | 9/1991 | Mangini et al. . | |
| 5,364,133 | 11/1994 | Hofer et al. . | |
| 5,421,942 | 6/1995 | Hoffmann | 156/289 X |
| 5,423,574 | 6/1995 | Forte-Pathroff . | |
| 5,448,846 | 9/1995 | Peterson et al. . | |
| 5,457,906 | 10/1995 | Mosher, Jr. . | |
| 5,518,787 | 5/1996 | Konkol | 156/257 X |
| 5,562,789 | 10/1996 | Hoffmann | 156/289 X |
| 5,581,924 | 12/1996 | Peterson . | |
| 5,653,472 | 8/1997 | Huddleston et al. . | |
| 5,662,976 | 9/1997 | Popat et al. . | |
| 5,721,178 | 2/1998 | Lalande | 428/42.2 X |
| 5,752,722 | 5/1998 | Moore et al. | 428/422 X |
| 5,837,337 | 11/1998 | Schnitzer | 428/42.3 X |
| 5,837,341 | 11/1998 | Johnstone | 428/42.3 X |
| 5,840,143 | 11/1998 | Swanson | 156/256 |

*Primary Examiner*—Terry Lee Melius
*Assistant Examiner*—Robert G. Santos
*Attorney, Agent, or Firm*—Oppenheimer, Wolff & Donnelly LLP

[57] ABSTRACT

An identification wristband and corresponding adhesive identification labels are supplied by a single printed laminated sheet material. The latter comprises a paper sheet of which a wristband part has a die cut, elongated, wristband strip and a label part having a plurality of die cut adhesive labels. The die cut wristband strip and the die cut labels are printed with correlated identification indicia. The under side of the label part is releasably adhered to a release sheet. A flexible transparent film is releasably adhered to the under side of the wristband part of the paper sheet. The transparent film is die cut to form two contiguous rectangular areas, each slightly larger than the firmly adhered die cut wristband strip. These die cut film areas are separated by a longitudinally bisecting line and each has a longitudinal, integral, tabular extension at opposite ends. To form a covered wristband, the die cut strip of the paper sheet is pressed on the printed side to separate it from the sheet. The die cut section of the film is peeled from its releasable adhesion to the under side of the sheet. Then the rectangular area of the film is folded along the bisecting line and adhered to the printed side of the band strip. This forms a wristband having a laminated transparent cover for the printed strip and with exposed adhesive tabs at each end thereof. The labels with correlated indicia can be affixed to medicine containers for a patient identified by the wristband.

25 Claims, 9 Drawing Sheets

LAMINATED ARTICLE

FIELD OF THE INVENTION

This invention relates to a laminated article that can be printed by sheet-fed printers and then converted to an identification wristband that has a covered and protected printed area

BACKGROUND OF THE INVENTION

Wristbands or bracelets with printed areas for identifying hospital patients have been described in a number of patents, for example, in U.S. Pat. Nos. 3,197,899; 4,314,415; 4,318,234; 4,612,718; 4,682,431; 5,026,084; 5,364,133; 5,423,574; 5,448,846; 5,457,906 and 5,581,924. Attention is also directed to U.S. Pat. No. 5,662,976, granted Sep. 2, 1997, and assigned to the assignee of this invention. This patent involves a laminated sheet structure of transparent plastic and card stock for forming a flat card, such as a membership card, protected by transparent plastic on both sides thereof. Returning to the hospital bands, efforts to improve the utility of identification wristbands or bracelets have been described in the first group of patents cited above. For example, the use of a transparent cover for the printed information has been proposed, e.g., in U.S. Pat. No. 3,197,899; a plurality of identification devices in sheet form for application of indicia by typewriter is proposed in U.S. Pat. No. 4,138,234; a band comprising a plurality of strips laminated together, with an insert underlying the outer strip and having indicia thereon is proposed in U.S. Pat. No. 4,314,415; and an identification band blank which can be removed from a hospital admission form and, with data applied thereto, secured by means of an adhesive tab portion to the wrist of a patient but with no protective cover for the data, is proposed in U.S. Pat. No. 4,682,431.

Each of the proposals of the cited art, however, has one or more disadvantages such as cost of manufacture, complexity of use, absence of a conveniently applied transparent cover for printed areas or inability to be printed in sheet fed printers or lack of convenient fastening means. A need exists for an easily manufactured article from which covered identification bands with adhesive fastening tabs can quickly and easily be formed. More particularly, a need exists for such an article in sheet form that can provide both bands and labels that are printed with correlated indicia by means of a sheet-fed printer and that can conveniently provide adhesive fastening tabs and a transparent cover for printed indicia. The present invention provides such an article.

SUMMARY OF THE INVENTION

The laminated article of the invention is adapted to provide a laminated identification band and comprises (a) a printable band sheet having a printing face and a lamination face, said lamination face, except in one or more die cut sections that are readily removable from the rest of the sheet, having a releasable surface that releases readily from adhesive contact;

(b) a flexible transparent film having an adhesive-coated face and a non-adhesive coated face, said film having one or more die cut sections of which a longitudinal line separates lower and upper elongated portions thereof, one such portion of each die cut section of the film being firmly adhered on its adhesive-coated face to the lamination face of a die cut section of the band sheet, and the rest of the film being releasably adhered to the lamination face of the band sheet, each said die cut section of the film, when released from the band sheet where the sheet has a releasable surface, being foldable along said longitudinal line to adhere an adhesive-coated face to the printing face of the die cut section of the band sheet and thereby form a laminated identification band, and each said die cut section of the film, when folded and adhered to the printing face of the die cut section of the band sheet, providing an adhesive-coated, integral, tabular extension at at least one end of said die cut section of the band sheet.

In a preferred embodiment the article of the invention includes both a printable band part and a label part, the latter comprising a plurality of die cut label sections and, on its lamination face, a pressure sensitive adhesive layer releasably adhered to a release sheet.

The invention also includes the novel wristband which can be formed from the laminated article of the invention and which comprises a generally rectangular and elongated paper strip having a printed face and a non-printed face, the non-printed face being firmly adhered to a substantially coextensive portion of an adhesive-coated film, the printed face of the paper strip being firmly adhered to and covered by a folded over portion of the adhesive-coated film and wherein at least the portion of said film adhered to the non-printed face or said folded over portion has an integral tab that extends longitudinally from the film adhered to the paper strip.

The invention further comprises the method of forming a printed wristband of the invention and correlated printed labels which comprises subjecting to a sheet-fed printing process a laminated sheet comprising a paper sheet having a printing face and a lamination face and further having a label part and a band part, the label part having one or more die cut label sections and the band part having one or more die cut band strips, said label part being releasably adhered on its lamination face to a release sheet and said band part being adhered on its lamination face to a flexible transparent film having a pressure-sensitive adhesive coating, said film being firmly adhered to the die cut band strip or strips and releasably adhered elsewhere to the band part, said film having one or more elongated die cut sections in each of which a longitudinal line separates a lower and an upper portion thereof, one such portion of each die cut section being firmly adhered to the die cut band strip, the rest of the film being releasably adhered to the band part, and at least one of such film portions having a longitudinal tabular extension, after printing correlated indicia on said label section or sections and on said band strip or strips by said sheet-fed printing process, pushing on the printed face of a die cut band strip to separate said strip from the rest of the paper sheet peeling said die cut section of film from the lamination face of the band part of the paper sheet and thereby separating the resulting assembly from the rest of the laminated sheet, folding said adhesive coated film along said longitudinal line into adhesive contact with the printed face of the band strip to form a transparent protective cover over said printed face and to provide an integral adhesive film tab at at least one end of the covered band strip.

BRIEF DESCRIPTION OF THE DRAWINGS

The invention will be described in more detail by reference to the drawings, of which.

DETAILED DESCRIPTION OF THE PREFERRED EMBODIMENTS

Figure 1:
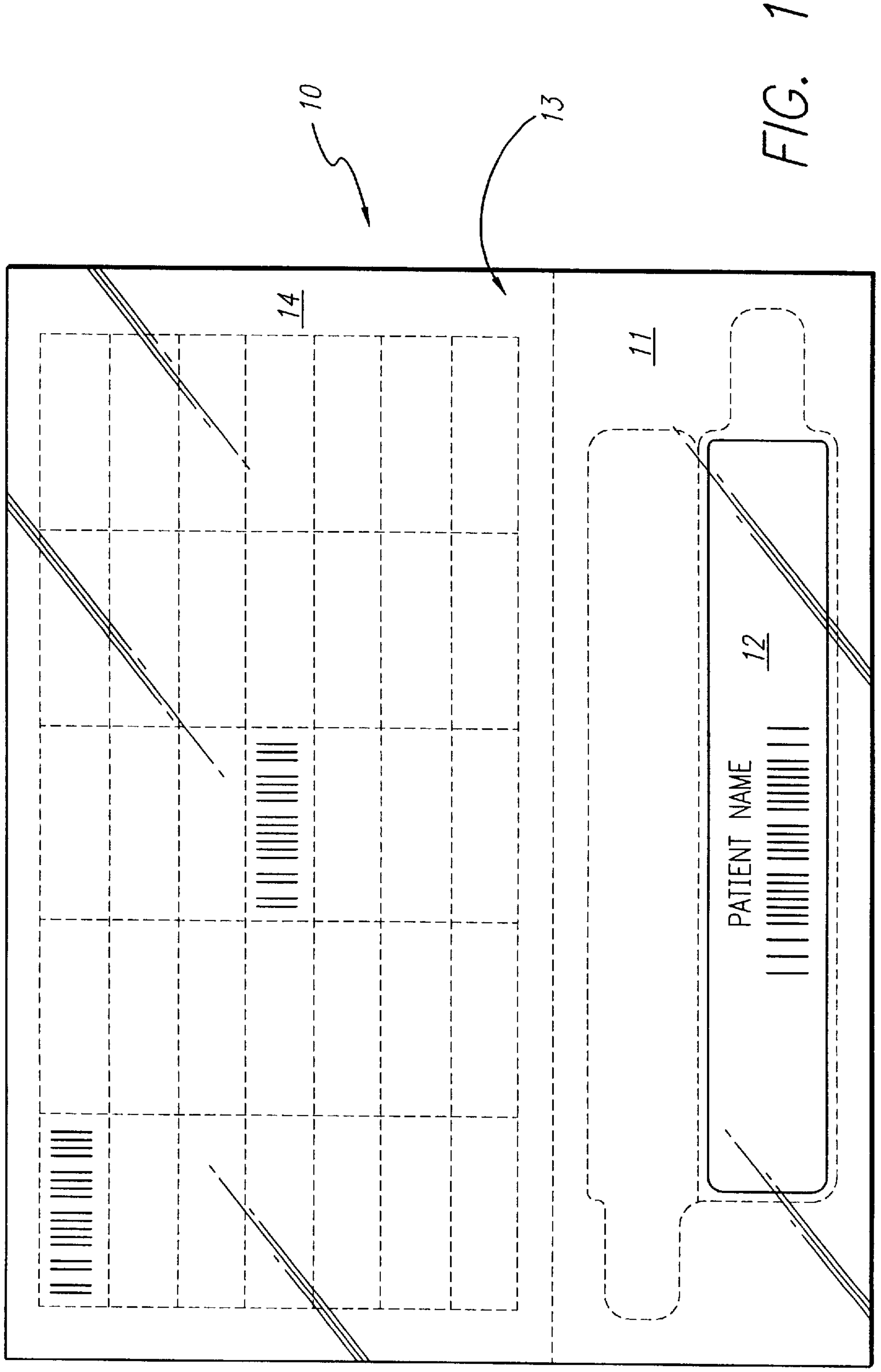
FIG. 1 is a plan view of a laminated article of the invention comprising a band part and a label part.

As shown in FIG. 1, a laminated article 10 illustrating one embodiment of the invention comprises a printable band part or sheet 11 that has a generally rectangular and elongated die cut section or strip 12 on which appropriate indicia are printed, such as the name of a hospital patient and/or a bar code that identifies the patient. In a preferred embodiment shown in FIG. 1, the band sheet 11 is part of a larger printable sheet 13 comprising the band part 11 and a label part 14. The term "band sheet" is used herein to refer both to a separate band sheet and, as in FIG. 1, to the band part of a larger printable sheet.

The term "printable" is used herein to include both a sheet that is pre-printed by lithographic or other printing technology and also a sheet that can be printed subsequently by sheet-fed office printers or by pencil, pen or any other means. Sheet 13 can be any printable sheet material such as paper, synthetic paper or a pigmented or transparent film. Preferably, however, sheet 13 is a paper sheet which can have a surface coating to improve its printability, for example, by ink jet or electrophotographic, toner or by offset printing. Most preferably, sheet 13 is a printable card stock.

Figure 2:
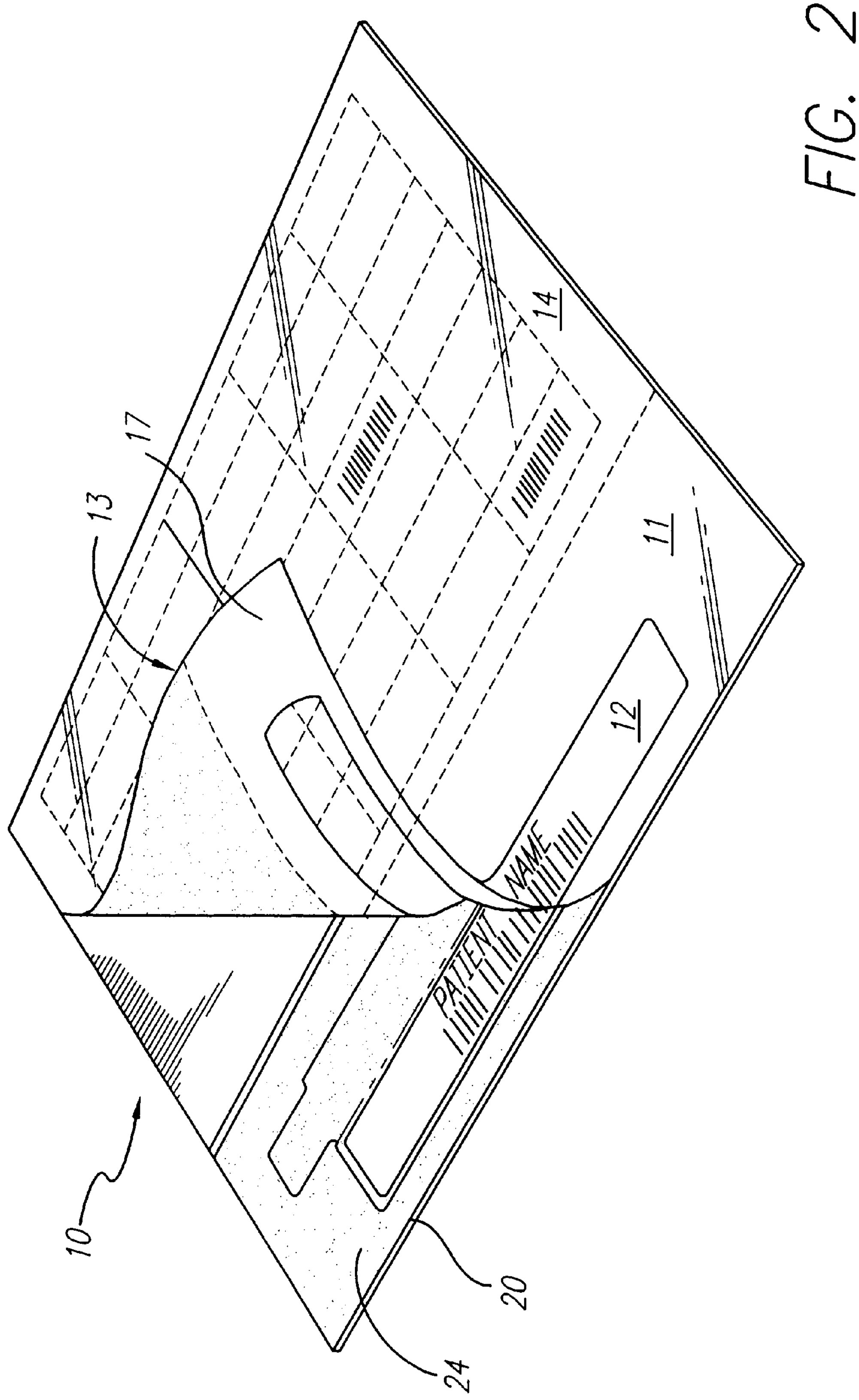
FIG. 2 is a perspective view from the upperside of a laminated article of the invention with layers partially separate

FIG. 2 is a perspective view of the laminated article 10 with its upper layer being the printable sheet 13. As shown in FIG. 2, the band part 11 of sheet 13 has a printing face 15 and a lamination face 17. The section or strip 12 is separable from sheet 13 and is formed by a die cut that penetrates only through the thickness of sheet 13. Face 15 is printed with appropriate identification indicia and the lamination face 17 of the band part 11, except in the die cut section 12, has a releasable surface that releases readily from adhesive contact. A flexible transparent film 20 having a pressure-sensitive adhesive coating 24 is adhered firmly to the lamination face of die cut section 12 and releasably elsewhere to the lamination face 17 of band part 11.

Figure 3:
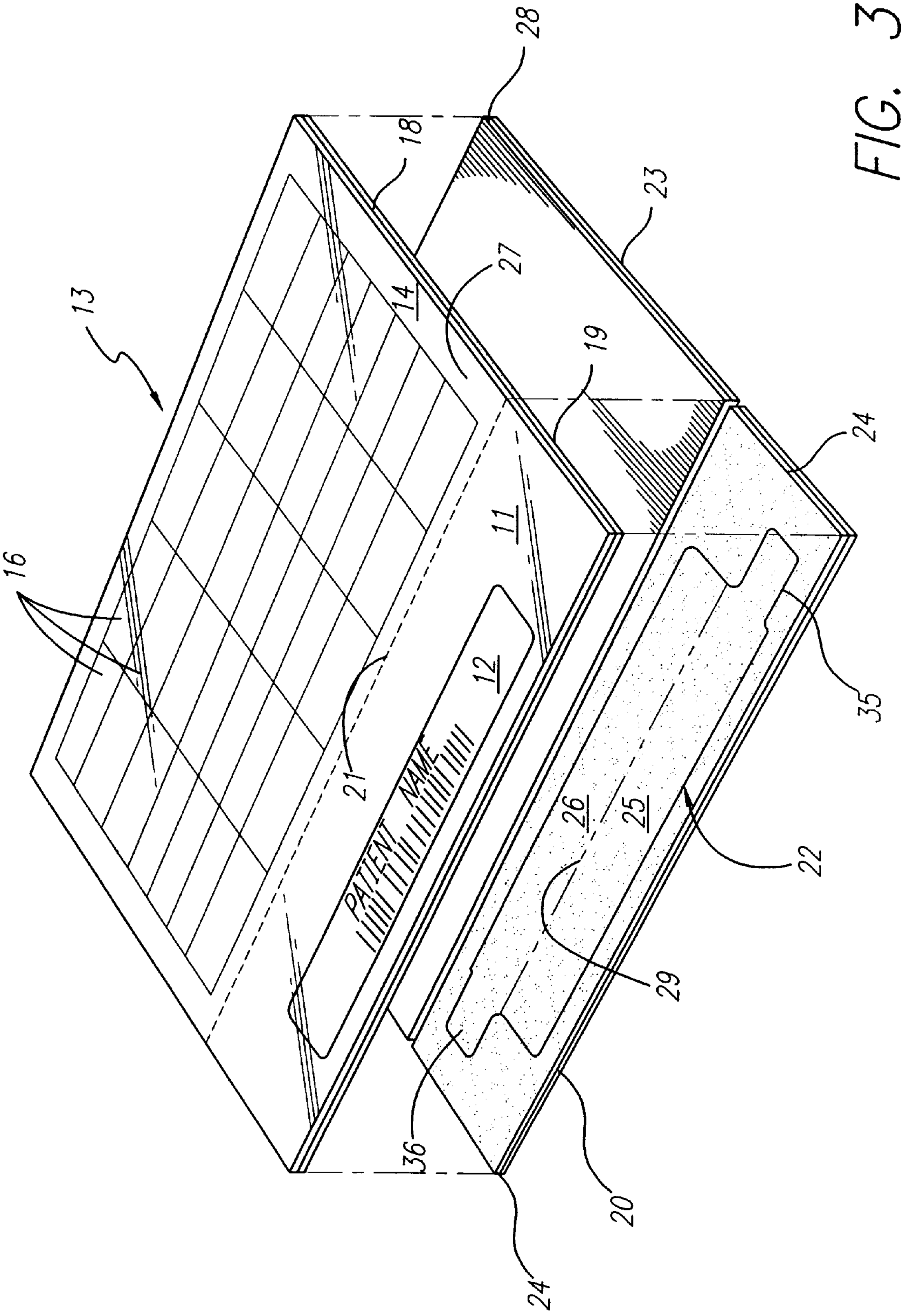
FIG. 3 is an exploded perspective view of the article showing layer relationships.

FIG. 3 is an exploded view of article 10 which shows the layer relationships. The thicknesses of the layers are exaggerated in order to show their positions. As FIG. 3 shows, the printable sheet 13 comprises a band part or band sheet 11 and a label part 14. The upperside or printing face 27 of sheet 13 is printed with label indicia in the die cut labels 16 of label part 14 and with correlated wristband indicia in the die cut section 12 of band part 11. On its under side, the label part 14 of sheet 13 is coated with a layer 18 of a pressure-sensitive adhesive composition. Except for the die cut section 12, the under side of the band part 11 of sheet 13 has a releasable surface, such as a coating of a release composition, e.g., a conventional silicone polymer composition, which is shown as layer 19. Concerning preferred materials for the adhesive, a hot melt rubber based adhesive is preferred; and for the release coating, an ultraviolet curable release coating is preferred. Band part 11 and label part 14 of sheet 13 are separable along line 21 which, preferably, is a perforated line in sheet 13.

Releasably adhered to the under side of label part 14 of sheet 13 is a sheet or liner 23 which has a releasable surface, e.g., a surface coated with a conventional silicone polymer composition, shown as layer 28. This provides releasable adhesion to the adhesive-coated label part 14. The release sheet 23 preferably is a paper sheet, but can be any other flexible sheet material, such as synthetic paper or polymeric film, opaque or transparent, that can be coated with a release composition or that otherwise releases readily from a pressure-sensitive adhesive layer, i.e., can be peeled from the adhesive layer without damage to either sheet.

Adhered to the under side of band part 11 is the transparent film 20 which has a pressure-sensitive adhesive coating shown as layer 24 in FIG. 3. Film 20 has a die cut section 22. This section of the film together with the die cut section or strip 12 of band sheet 11 comprises the band-forming assembly which will form the wristband. In the area of the release coating 19, the film 20 adheres releasably to the under side of band part 11. However, in the die cut section 12, where band part 11 has no release coating on its lamination face, the corresponding die cut section of film 20 adheres firmly to the underside of die cut band section 12.

Incidentally, with respect to the showing of FIG. 3, the liner sheet 23 and the transparent film 20 may be a single sheet, for example of mylar, or other transparent plastic. Also, the silicone release layers are greatly exaggerated in thickness, as they would normally be substantially less than one mil thick.

FIG. 3 shows that the die cut section 22 of film 20 comprises lower and upper, elongated and generally rectangular portions 25 and 26 that are separated by a longitudinally bisecting line 29. The portions 25 and 26 preferably are substantially equal in area and each is substantially coextensive with, i.e. equal to or, preferably, slightly larger than the area of the rectangular die cut section 12 of the printable sheet. Extending from the elongated, generally rectangular portions are adhesive-coated, integral, longitudinal tabular extensions 35 and 36, the function of which will be explained hereinafter.

Figure 4:
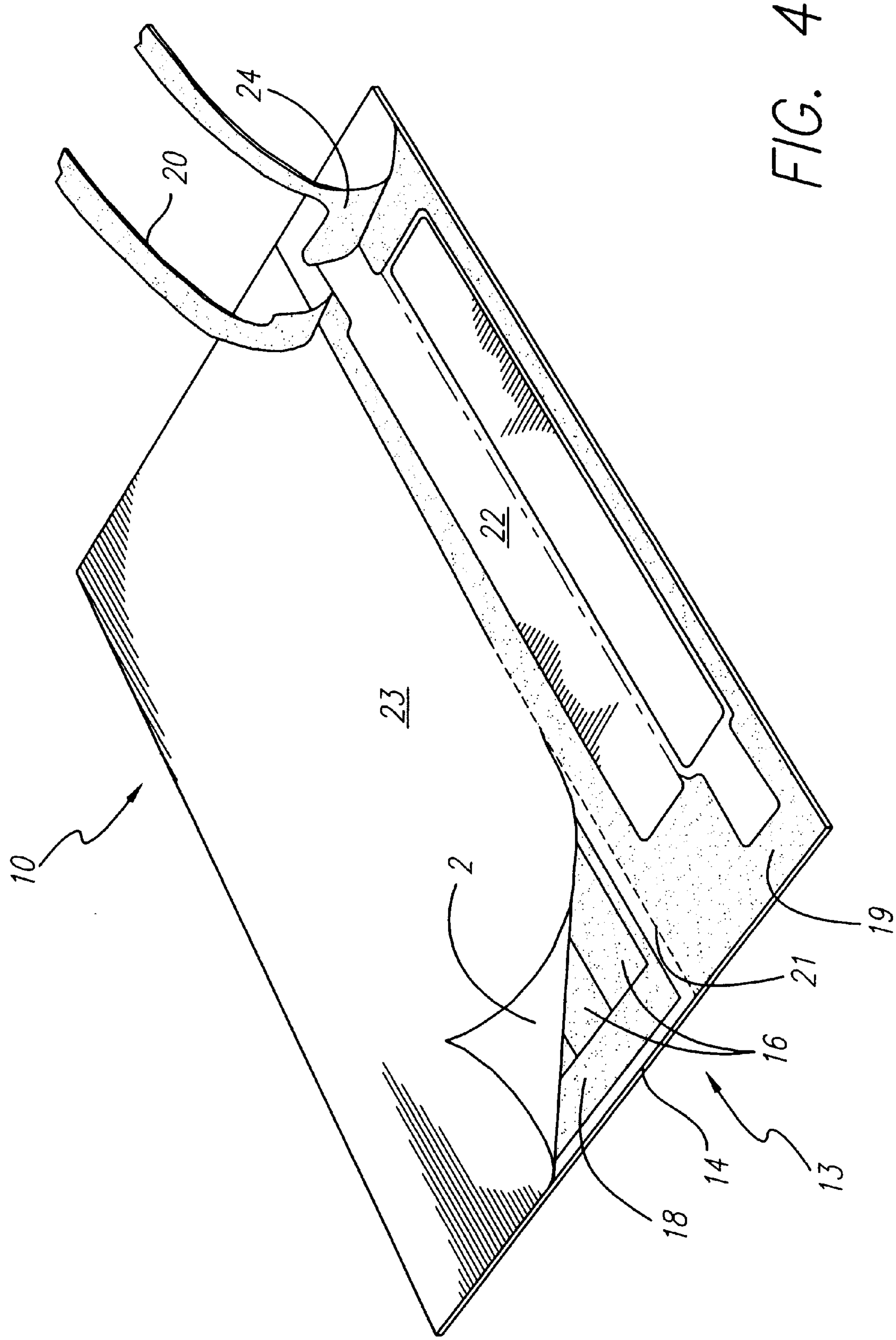
FIG. 4 is a perspective view from the underside of a laminated article of the invention with the release sheet and the transparent film partially lifted from the lamination face of the printable sheet.

FIG. 4 provides a perspective view from the underside of the laminated article 10 with layers partially separated. As shown in FIG. 4, the label part 14 of sheet 13 is coated with a pressure-sensitive adhesive layer 18. Both the sheet 13 and the adhesive layer coated thereon are die cut to form adhesive labels 16. Releasably laminated to the label part of sheet 13 is the release sheet 23 having the release coating 28. The labels 16, being die cut, are readily removable from part 14 of sheet 13 and can be peeled from the release sheet 23. They then provide printed adhesive labels that can be affixed to medicines or property of the person identified by the wristband obtained from the same sheet 13.

As shown in FIG. 4, the label part 14 and the band part 11 of sheet 13 preferably are separated by a perforated line 21 or other linear means for weakening the attachment of the two parts to each other. This facilitates separation of the two parts after the sheet 13 has been printed, so that the band part can be more conveniently converted to a wristband and the label part can be separately filed or otherwise maintained. Preferably, the separation line 21 is parallel to a side of the rectangular sheet 13.

The line 21 also is a line of demarcation between the adhesive-coated lamination face of the label part 14 of sheet 13 and the non-adhesive coated band part 11. As indicated in FIG. 4, the lamination face of band part 11 has a releasable surface, e.g., is coated with a release layer 19, which can be of the same composition as layer 28 coated on the release sheet 23.

As shown in FIG. 4, the release-coated lamination face of the band part 11 is releasably adhered to the adhesive-coated transparent, flexible film 20 which is die-cut to define the band section 22. Film 20 can be any transparent flexible film having a thickness, for example, of about 2 mils. The term transparent, as used herein, refers to films through which printing can be read when the film is adhered to a printed surface. This includes films that are merely translucent when not adhered to a substrate. Film 20 is coated on its lamination face with a pressure-sensitive adhesive layer 24. The adhesive can be the same type of pressure-sensitive adhesive as in the adhesive layer 18 of the label part 14.

Figure 5:
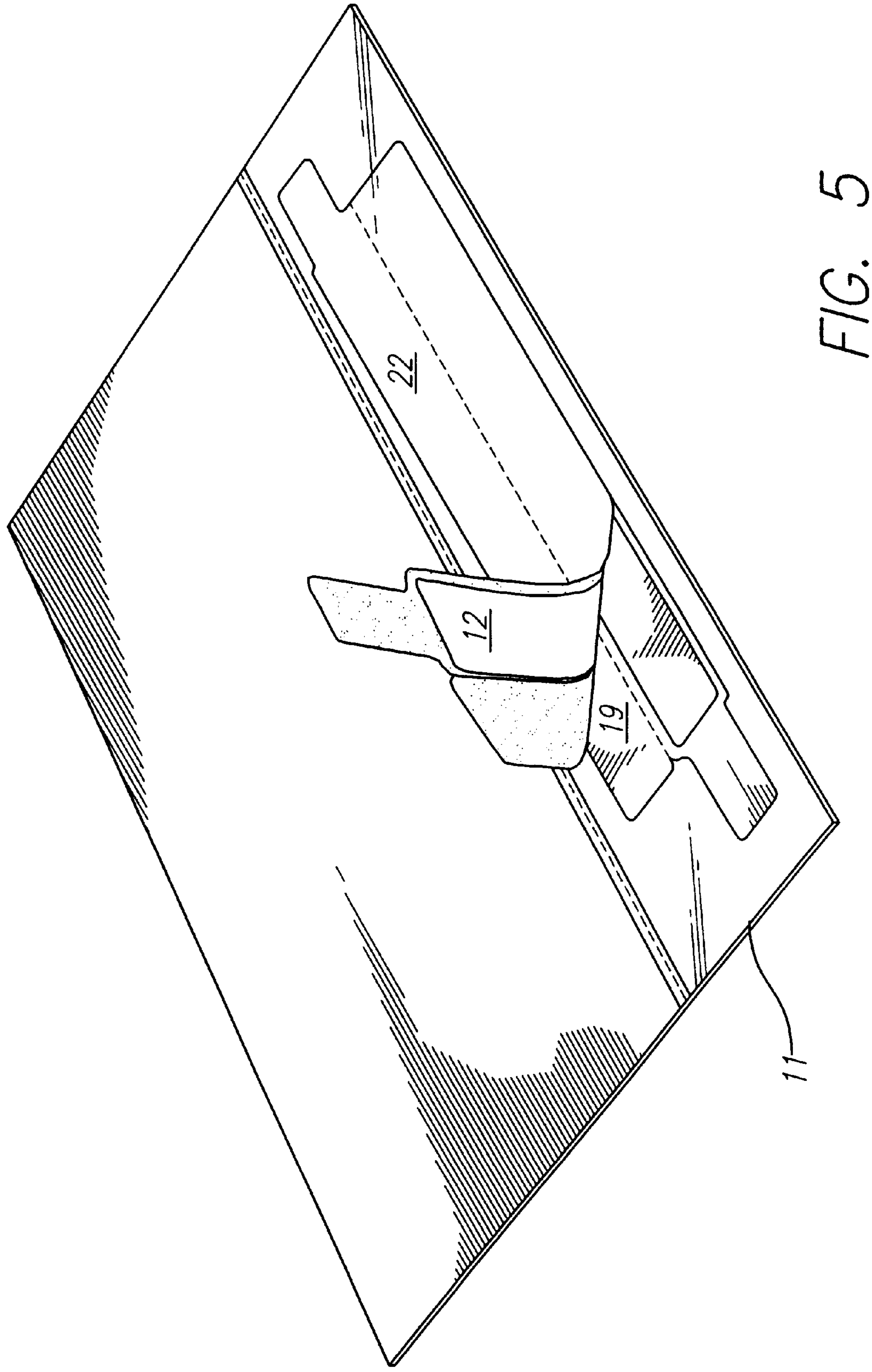
FIG. 5 is an underside perspective view of the laminated article with a band-forming assembly partially released from the printable sheet.
Figure 6:
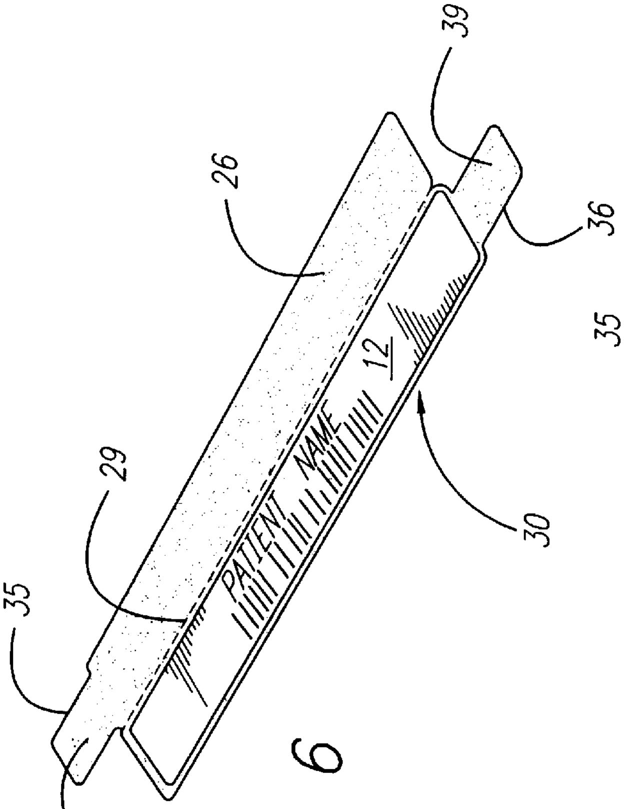
FIG. 6 is a perspective view of a wristband assembly after separation from the rest of the laminated article and before the adhesive coated film is folded over the printed face.
Figure 7:
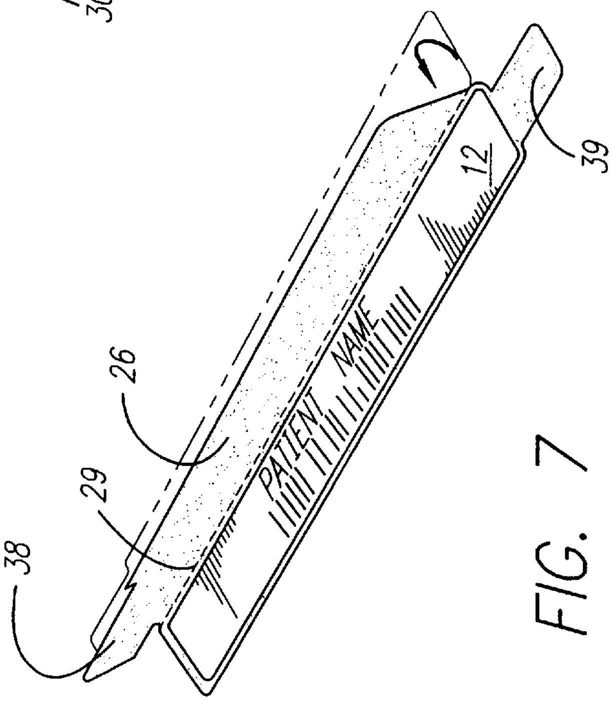
FIG. 7 shows a wristband assembly while the film is being folded over.

FIG. 4 shows a portion of the adhesive-coated transparent film 24 lifted along the die cut line from its releasable adhesion to band part 11 and leaving in position the die cut, band-forming section 22 of the film. The lifting of a portion of the film 24 is shown in the figure to reveal the layer relationships but is not necessary for removing the band forming assembly from the laminated article 10. Preferably, the band-forming assembly is released from the laminated article or sheet 10 in the manner illustrated in FIG. 5. As shown in FIG. 5, the user turns the sheet over, then presses upwardly on the printed side of band area 12 and slowly peels the die cut section 22 of the clear film away from the release layer 19 of band part 11 When this is done, the band-forming assembly 30 shown in FIG. 6 is obtained. To form a covered wristband, the film portion 26 is folded over the generally rectangular and elongated paper strip 12 along fold line 29, as shown in FIG. 7. The film portion 26 adheres to the printed band strip 12 and provides a transparent protective cover for the printed area of wristband 37 that, in a preferred embodiment, is slightly larger than the paper strip, as shown in FIGS. 1, 2 and 4–8.

Figure 8:
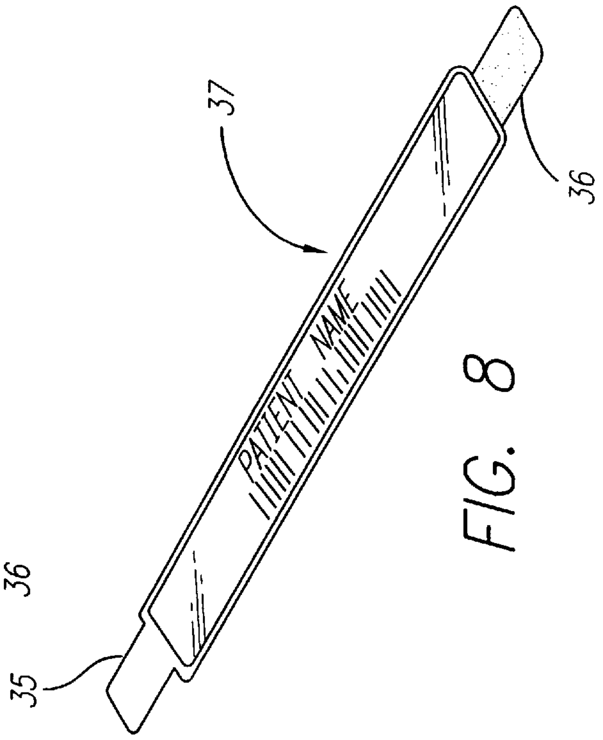
FIG. 8 shows a wristband of the invention after the film is folded over.
Figure 9:
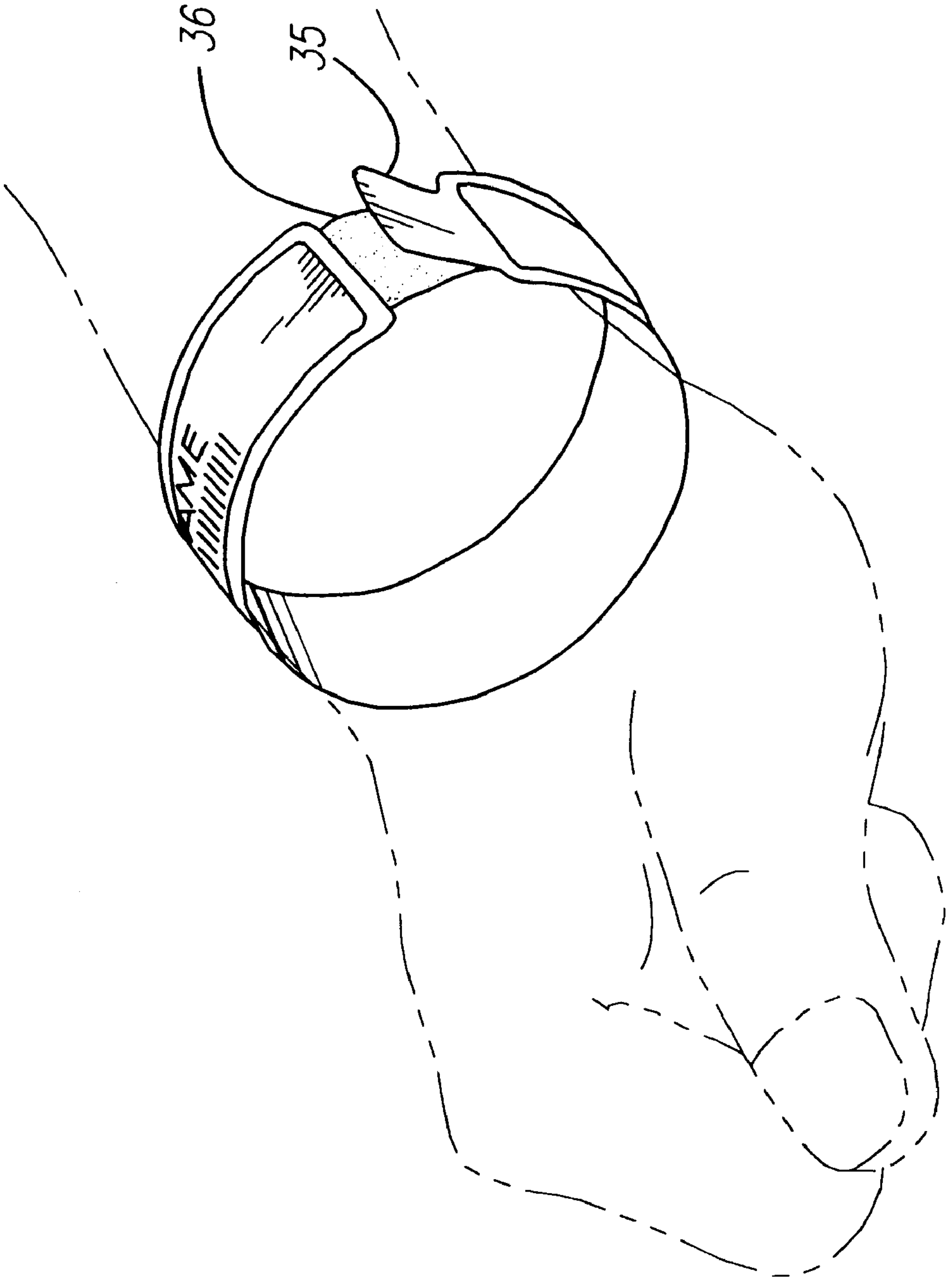
FIG. 9 is a perspective view of a wristband of the invention on the wrist of a wearer.

FIG. 8 also shows that at each end of the elongated printed paper strip, integral tabs 35 and 36 extend from the adhesive coated film. FIGS. 5, 6 and 7 show that the tabs 35 and 36 have opposing adhesive-coated faces 38 and 39. As shown in FIG. 9, when the identification band is applied to the wrist of a patient to form a bracelet, the adhesive-coated tabs 35 and 36 are pressed together on their opposing adhesive-coated faces to fasten the band to the wrist. If desired, the band diameter can be reduced by wrapping the band more snugly to the wrist and adhering the adhesive-coated tabs to non-coated areas of the band.

The embodiment shown in FIG. 8, wherein the identification band 37 has two tabular extensions 35 and 36, is a preferred embodiment. However, the wristband of the invention includes embodiments having at least one such tabular extension and thus includes embodiments having only one such extension. In that case, the tabular extension can be at one end of either of the upper or lower portions of the die cut section of the adhesive-coated film.

Also, in the embodiment shown in FIG. 5 and other figures, the die cut strip 12 of the printed sheet is adhered to the lower portion 26 of the die cut section of the adhesive-coated film. It can instead, however, be adhered to the upper portion 25. In that case, when the wristband assembly 30 is removed from article 10, the lower portion 25 would be folded over to cover the printed strip 12 when forming a bracelet or wristband.

Figure 10:
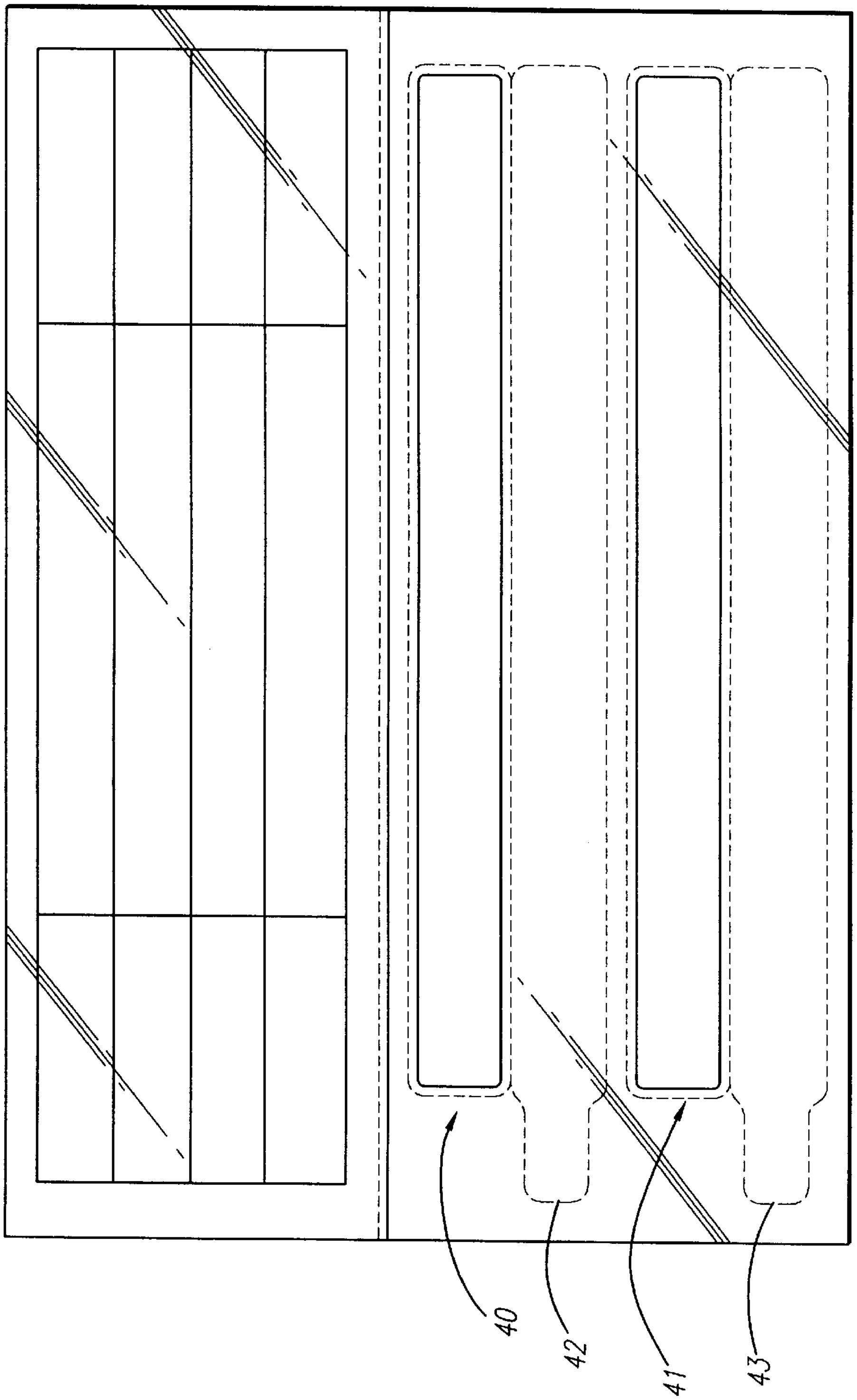
FIG. 10 is a plan view of an embodiment of the invention comprising a label part and a band part, the latter having a plurality of band-forming assemblies.

Although FIGS. 1–5 illustrate one preferred embodiment of the laminated article of the invention, it should be understood that the laminated article can have other forms. Thus, the band part of the article can provide a plurality of band-forming assemblies. Furthermore, the band-forming assemblies and the bands formed from them can have a single integral tabular extension instead of two. Such an article is illustrated by FIG. 10, from the cardstock side of the assembly. The structure of the article is otherwise the same as described above with reference to FIGS. 1–5 but the band part comprises a plurality of bandforming assemblies 40 and 41 and each such assembly has only one integral tabular extension, i.e., tabs 42 and 43. The band-forming assembly is removed from the band part and the wristband is formed in the same manner as previously described.

Figure 11:
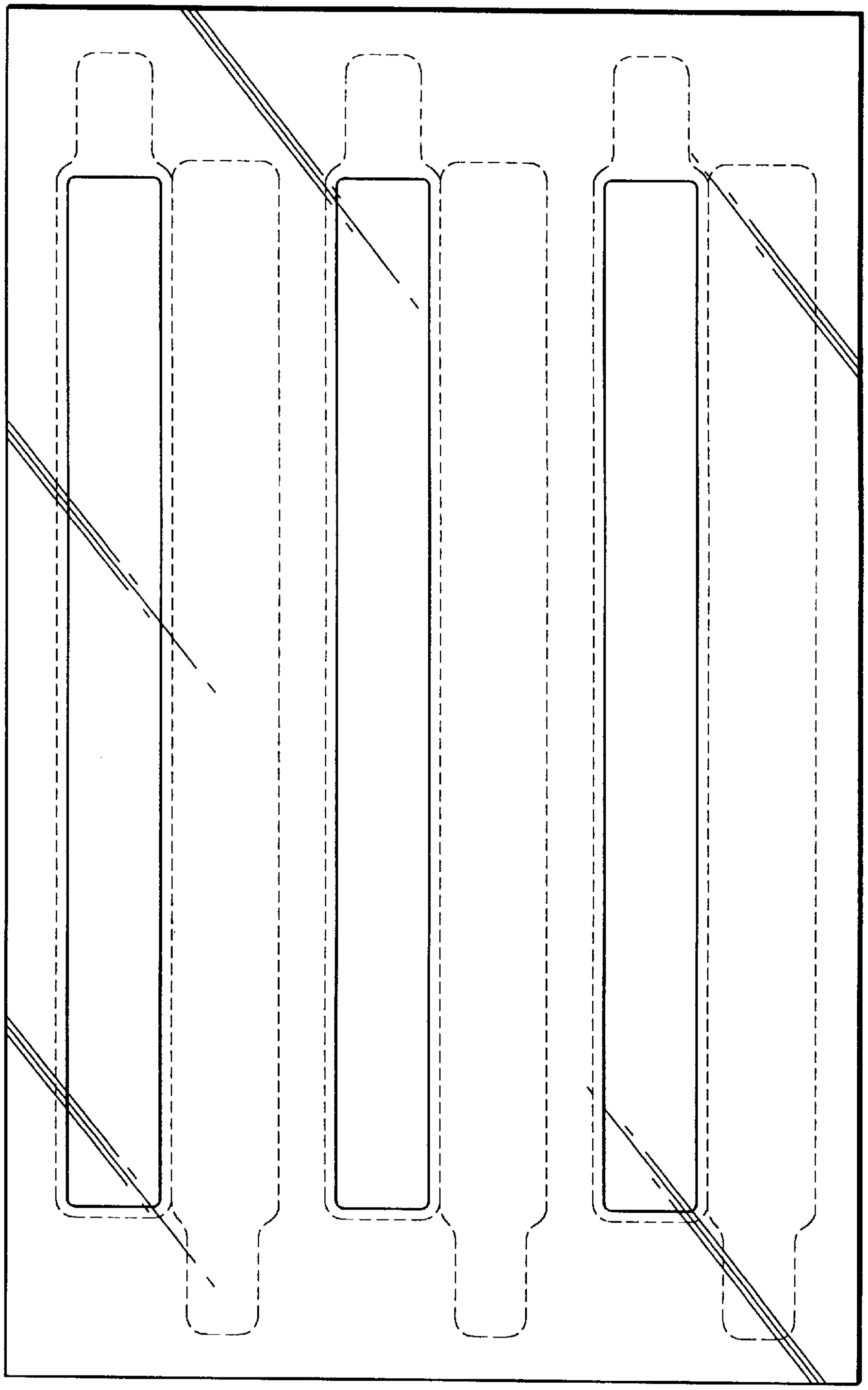
FIG. 11 is a rear or bottom view of an embodiment of the invention having no label part but having a plurality of band-forming assemblies, as viewed from the transparent plastic side of the laminated assembly.

FIG. 11 illustrates a rear or bottom view of another embodiment of the article of the invention which comprises a band sheet having one or more band-forming assemblies but having no attached label part as do the embodiments of FIGS. 1–5 and 10. Again in this embodiment, the band-forming assemblies and the resulting wristbands are as previously described with reference to FIGS. 6–9. With the view of FIG. 11 being from the transparent side of the assembly, the cardstock die cuts are shown in solid lines, as they would be visible through the transparent mylar or other transparent sheet material.

In manufacturing the laminated article of the invention, the die cuts preferably are made in the paper sheet 13 and the film 20 after they are laminated together. To avoid cutting too deeply, all die cut sections are formed as so-called "kiss" die cuts of limited depth, cutting through a single ply of the assembly. Thus, the labels 16 and the printable band strip 12 are formed by making "kiss" die cuts on the front or printable side of sheet 13 and only the paper and its coating are cut in this operation. Likewise, to form the die cut section of the film, a "kiss" die cut is made on the back side of sheet 10 and the cut penetrates only through the film and its adhesive coating.

One advantage of the article of the invention is that it provides a simple means for fastening the identification band to the wrist, namely, the adhesive tabs, but, if desired, other fastening means such as metal clips or staples can be employed in lieu of or in addition to the adhesive tabs.

Although the identification band of the invention may find its greatest utility as a wristband for hospital patients, it can have other uses. For example, it can serve as a wristband for children, as an identification band for animals, and as a band for identifying inanimate objects such as furniture and the like.

Materials From Which the Preferred Embodiment is Constructed

The laminated article of the invention, including the printable sheet, the transparent film, the adhesive layer, the release layer and the release sheet can comprise materials of a number of compositions, each of which can have a range of thicknesses.

The printable sheet typically is paper having a thickness of 4 to 10 mils, with approximately 6 mils being especially desirable. The sheets and layers are shown in the drawings thicker than their actual dimensions and are not to scale. Preferably the printable sheet is formed of heavy paper or light cardboard stock, also known as card stock. It can be made, for example, from 100 lb. velum card stock, which is available from a number of paper manufacturers and vendors, such as the Simpson Corporation or as 80 lb. Litho from Boise Cascade (Boise, Iowa). Incidentally, where reference is made to 10 lb. or 80 lb. basis weight paper or cardstock, reference is made to the weight of 500 sheets, 25 inches by 38 inches in size. Lateral dimensions of the paper can vary considerably but sheet dimensions of 8 ½×11 inches are usually preferred.

It is explained herein and shown in the drawings that the die cut portions of film that form the wristband can each be slightly larger in area than the die cut paper strip covered by the film. As one example of suitable dimensions, the paper strip, has a length of 7 ¼ inches, and a width of ¾ inch. The die cut portions of film adhered to its lamination face and its printing face each have a width of ⅞ inch. With these dimensions the two film portions extend beyond the paper strip by 1/16 inch on each side of the strip.

In the embodiment that includes both a label part and a band part, the parts can be separated by a perforated line, e.g., by a line of microperforations; that vary in size from 0.0095 to 0.0105 inches and are separated by ties that vary from 0.0045 to 0.0055 inches. Thus, there are preferably between 63 and 69 perforations per inch, with about 66 perforations being a preferred average. More generally, the term "microperforations" indicates that there are more than about 35–40 perforations per inch.

The adhesive employed in the laminated article of the invention is a stable, pressure-sensitive adhesive. Preferably the pressure sensitive adhesive is of a composition that will remain stable and not flow when subjected to temperatures as high as 300 to 400 degrees F. in order to facilitate printing on the laminated article by laser or other high temperature printing equipment. The adhesive also should not easily degrade when exposed to ultra-violet light. That is, exposure to ultra-violet light during normal use of the card should not turn the adhesive yellow or cause it lose its tackiness. One such adhesive is described in U.S. Pat. No. 5,262,216, which is incorporated herein by reference. A preferred adhesive is the P32 hot melt adhesive which is available from the Avery Dennison Corporation. Generally speaking, the adhesive coating should have a thickness of about 0.25 to 2.0 mils.

Mylar® polyester film available from DuPont Company is a preferred transparent flexible film for the laminated sheets, but other polymeric films are also useful, e.g., polyolefin, cellulose ester and the like. The film preferably is between 1 and 4 mils thick, with 2 mils being preferred.

The release sheet or liner for the label part can be any flexible paper or film and can be transparent, translucent or opaque. Preferably, however, the release or backing sheet is a paper sheet of approximately the same thickness as the plastic film to eliminate bias that can be created if there is a significant difference in thickness between the transparent plastic and the release coated backing. A preferred material for this purpose is 16 lb. paper, which has a thickness, e.g., of approximately 2.3 to 2.5 mil.

The release coating composition preferably is a conventional silicone composition but other release compositions such as fluorinated or amine-based release compositions can be used. The release composition coating can be extremely thin, e.g., in the range from about 0.1 to 0.5 mils.

The overall thickness of the laminated article should not exceed about 15 mils. Conventional sheet-fed printers such as laser printers and ink jet printers tend not to work well with sheets having thicknesses greater than 15 mils. However, if future printers are capable of accepting assemblies having a thickness greater than 15 mils, then the maximum thickness may be increased.

Additionally, the sheet materials preferably are substantially flat so that the overall laminated article has substantially constant thickness throughout its entire width and length, thereby reducing the likelihood that the sheet will jam in the complex paper path of a printer. The sheets preferably are also free from apertures, tractor-feed holes, depressions and the like other than die cuts, perforations and other minor discontinuities.

From the foregoing it is apparent that the present invention provides an improved means for forming identification bands or bracelets as well as labels, which can be on a single sheet. Important advantages include, as already mentioned, the ease of printing correlated indicia on the band and label parts of the laminated article. Ease of manufacture of the laminated article itself is also an advantage, inasmuch as the lamination face of the printable sheet can be coated in-line with an adhesive composition in one elongated area and with a release composition in a parallel elongated area, while leaving uncoated the band strips of the lamination face. In addition, the release sheet and adhesive-coated film can readily be adhered to the printable sheet by well-known methods and apparatus. Importantly, the die cut area of the film has a simple pattern that can readily be die cut to provide a portion that folds along a longitudinal line to form both a transparent cover for the band and adhesive-coated longitudinal fastening tabs.

Concerning manufacture of the product of FIGS. 1 through 5, for example, a continuous process would involve rolls of the three types of sheet material which are involved. The rolls of cardstock may be initially coated with patterned release layer, with successive final sheets being marked with index marks; and then adhesive would be coated over the width of the roll. The next step would be to pattern coat with release layer, and then the rolls of (1) transparent plastic such as mylar and (2) release coated backing paper would be rolled onto the coated cardstock. Finally, the die cutting of both sides and the sheeting would be accomplished, with the index marks assuring synchronization of the process steps.

Concerning other aspects of the invention, if desired, instead of using a separate section of release coated backing material 23 as shown in FIG. 3 of the drawings, the transparent sheet material 20 may extend across the entire sheet, and have the release coating 28 under the labels 16, to permit easy removal of these labels.

Concerning another minor matter, for completeness, the materials and other details as set forth in the specification of U.S. Pat. No. 5,662,976 are hereby incorporated by reference into this specification, as they may be employed in the implementation of the present invention.

Although the invention has been described in detail with particular reference to certain preferred embodiments thereof, it will be understood that variations and modifications can be effected within the spirit and scope of the invention as described hereinabove, and as defined in the appended claims.

What is claimed:

1. A laminated article adapted to provide at least one laminated identification band, said article comprising:

(a) a printable band sheet having a printing face and a lamination face, said lamination face having one or more elongated die cut sections that are readily removable from the rest of the printable band sheet and a releasable surface that releases readily from adhesive contact;

(b) a flexible transparent film having an adhesive-coated face and a non-adhesive coated face, said film being releasably adhered to the lamination face band sheet, said film having one or more die cut sections, in each of which a longitudinal line separates lower and upper elongated portions thereof, and one such portion of each die cut section of the film being juxtaposed to the lamination face of a die cut section of the band sheet to form a set of elements for forming an identification band, said set including said band sheet and said juxtaposed film die cut section; and, each said set, when released from the band sheet and the film along the respective die cut sections being foldable along said longitudinal line to adhere an adhesive-coated face of the transparent film section to the printing face of the die cut section of the band sheet and thereby form a laminated identification band, and each said die cut section of the film, after having been folded and adhered to the printing face of an elongated die cut section of the band sheet providing an adhesive-coated, integral, tabular extension on at least one end of said die cut section of the band sheet, wherein the at least one tabular extension is adapted to be coupled to the opposing end of said die cut section of the band sheet to form at least one laminated identification band.

2. An article according to claim 1 wherein the releasable surface of the lamination face of the band sheet is a surface coated with a release composition.

3. An article according to claim 1 wherein each said die cut section of the printable band sheet is an elongated, generally rectangular strip.

4. An article according to claim 2 wherein the adhesive of the adhesive-coated face is a pressure-sensitive adhesive.

5. An article according to claim 2 wherein the release composition is a silicone polymer composition.

6. An article according to claim 1 wherein said printable band sheet is opaque, the adhesive is a pressure-sensitive adhesive and the releasable surface is a surface coated with a silicone polymer composition.

7. An article according to claim 6 wherein said printable band sheet is a paper sheet.

8. An article according to claim 7 which is adapted to provide a plurality of laminated identification bands.

9. An article according to claim 1 wherein said longitudinal line bisects the die cut section of the film and separates lower and upper, elongated, generally rectangular portions of said die cut section, each portion having an area that is substantially coextensive with that of a corresponding die cut section of the band sheet.

10. An article according to claim 9 wherein each of said generally rectangular portions of the die cut section of the film is slightly larger than the corresponding die cut section of the paper sheet.

11. An article according to claim 1 wherein said lower and upper portions of the die cut section of the adhesive-coated film are each generally rectangular and of substantially equal areas and each has an integral tab extending longitudinally at opposite ends thereof and wherein said integral tabs of the adhesive-coated film present the adhesive coating on opposite faces when the die cut section of the film is folded to cover the printing face of the die cut section of the band sheet, whereby the tabs can be adhered together to form a circular band.

12. A laminated article according to claim 1 which is adapted to provide a plurality of laminated identification bands, wherein said lamination face of the printable band sheet is coated with a release composition except in a plurality of die cut sections, each of which sections is readily removable from the rest of the sheet, and wherein said film has a plurality of die cut sections, in each of which a longitudinal line separates lower and upper elongated portions thereof and in each of which sections one such portion is firmly adhered to the lamination face of a corresponding die cut section of the band sheet and the rest of the film is releasably adhered to the lamination face of the band sheet, and wherein each of said die cut sections of the film, when released from the band sheet where the sheet is coated with a release composition, is foldable along said longitudinal line to adhere an adhesive-coated face to the printing face of the corresponding die cut section of the band sheet and thereby form a laminated identification band.

13. An article according to claim 1 wherein the article is coupled to a corresponding adhesive label sheet.

14. An article according to claim 13 wherein the adhesive label sheet has a plurality of labels.

15. An article according to claim 1 wherein said lamination face except in one or more of said elongated die cut sections has said releasable surface that releases readily from adhesive contact.

16. A laminated article adapted to provide at least one laminated identification wristband and a plurality of corresponding adhesive identification labels which comprises a printable paper sheet having a lamination face and a printing face, and comprising a label part and a band part, the lamination face of said label part having a pressure-sensitive adhesive layer which is releasably adhered to a release sheet, said label part further having one or more die cut label sections that are releasable from the release sheet to provide adhesive labels, said band part comprising one or more die cut, elongated paper strips, the lamination face of said band part being coated with a release composition, a flexible transparent film having an adhesive-coated face and a non-adhesive-coated face, said adhesive coated face being adhered to the lamination face of said paper sheet, said film having one or more die cut sections in each of which sections a longitudinally bisecting line separates lower and upper elongated portions thereof, one such portion being adhered on its adhesive coated face to the lamination face of a corresponding die cut strip of the paper sheet and the rest of said die cut section of the film being releasably adhered to the paper sheet.

17. An article according to claim 16 wherein said die cut strips of the band part and the die cut sections of the film are adapted to form a printed identification bracelet having a transparent film covering a printed paper strip and said label sections of the paper sheet are adapted to serve as adhesive labels printed with indicia correlated to indicia on the identification bracelet.

18. An article according to claim 17 wherein said die cut label sections and said die cut strips are preprinted, with correlated bar codes.

19. The method of forming a printed identification wristband and correlated printed labels which comprises subjecting to a sheet-fed printing process a laminated sheet comprising a paper sheet having a printing face and a lamination face and further having a label part and a band part, the label part having one or more die cut label sections and the band part having one or more die cut band strips, said label part being releasably adhered on its lamination face to a release sheet and said band part being adhered on its lamination face to a flexible transparent film having a pressure-sensitive adhesive coating, said film being firmly adhered to the die cut band strip or strips and releasably adhered elsewhere to the band part, said film having one or more elongated die cut sections in each of which a longitudinal line separates lower and upper elongated portions thereof, one such portion of each die cut section being releasably adhered to the band part, and at least one of such film portions having a longitudinal tabular extension, after printing correlated indicia on said label section or sections and on said band strip or strips by said sheet-fed printing process, pushing on the printed face of a die cut band strip to separate said strip from the rest of the paper sheet, peeling said die cut section of film from the lamination face of the band part of the paper sheet and thereby separating the resulting assembly from the rest of the laminated sheet, folding said adhesive coated film along said longitudinal line into adhesive contact with the printed face of the band strip to form a transparent protective cover over said printed face and to provide an integral adhesive film tab on at least one end of the covered band strip.

20. A wristband comprising:

a generally rectangular and elongated paper strip having a printed face and a non-printed face, the non-printed face being adhered to a substantially coextensive portion of an adhesive-coated film, the printed face of the paper strip being firmly adhered to and covered by a folded over portion of the adhesive-coated film and wherein at least the portion of said film adhered to the non-printed face or said folded over portion has an integral tab that extends longitudinally from the film adhered to the paper strip; and both the portion of the film adhered to the non-printed face of the paper strip and the folded over portion adhered to the printed face have integral tabs extending longitudinally at opposite ends of the paper strip, said tabs having pressure-sensitive adhesive coatings on opposite faces thereof.

21. A wristband according to claim 20 wherein the portion of the film to which the non-printed face of said paper strip is adhered and the folded-over portion of the adhesive-coated film are each slightly larger in area than the paper strip.

22. A laminated article adapted to provide at least one laminated identification band, said article comprising:

(a) a printable band sheet having a printing face and a lamination face, said lamination face having one or more elongated die cut sections that are readily removable from the rest of the printable band sheet and a releasable surface that releases readily from adhesive contact;

(b) a flexible transparent film having an adhesive-coated face and a non-adhesive coated face, said film being releasably adhered to the lamination face band sheet, said film having one or more die cut sections, in each of which a longitudinal line separates lower and upper elongated portions thereof, and one such portion of each die cut section of the film being juxtaposed to the lamination face of a die cut section of the band sheet to form a set of elements for forming an identification band, said set including said band sheet and said juxtaposed film die cut section; and, each said set, when released from the band sheet and the film along the respective die cut sections being foldable along said longitudinal line to adhere an adhesive-coated face of the transparent film section to the printing face of the die cut section of the band sheet and thereby form a laminated identification band, and each said die cut section of the film, after having been folded and adhered to the printing face of an elongated die cut section of the band sheet providing an exposed adhesive-coated, integral, tabular extension on at least one end of said die cut section of the band sheet, wherein the one or more elongated die cut sections of the printable band sheet are at least several times longer than the tabular extension.

23. A wristband comprising a generally rectangular and elongated paper strip having a printed face and a non-printed face, the non-printed face being adhered to a substantially coextensive portion of an adhesive-coated film, the printed face of the paper strip being firmly adhered to and covered by a folded over portion of the adhesive-coated film and wherein at least the portion of said film adhered to the non-printed face or said folded over portion has an integral tab that extends longitudinally from the film adhered to the paper strip, wherein both the portion of the film adhered to the non-printed face of the paper strip and the folded over portion adhered to the printed face have integral tabs extending longitudinally at opposite ends of the paper strip, said tabs having pressure-sensitive adhesive coating on opposite faces thereof.

24. A wristband according to claim 23 wherein the portion of the film to which the non-printed face of said paper strip is adhered and the folded-over portion of the adhesive-coated film are each slightly larger in area than the paper strip.

25. A wristband according to claim 23 wherein the wristband has substantially constant thickness.

* * * * *